US012668474B2

(12) United States Patent
Tanaami et al.

(10) Patent No.: US 12,668,474 B2
(45) Date of Patent: Jun. 30, 2026

(54) OPERATION DEVICE AND CARRIAGE

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 273 days.

(21) Appl. No.: 18/462,486

(22) Filed: Sep. 7, 2023

(65) Prior Publication Data

US 2024/0140771 A1 May 2, 2024

(30) Foreign Application Priority Data

Oct. 31, 2022 (JP) ................................. 2022-174918

(51) Int. Cl.
*B66F 17/00* (2006.01)
*B66F 11/04* (2006.01)

(52) U.S. Cl.
CPC ............ *B66F 17/006* (2013.01); *B66F 11/04* (2013.01)

(58) Field of Classification Search
CPC .... B62B 5/0073; B62D 51/04; B62D 51/001; B62D 63/04; B62D 63/02; B66F 17/006; B66F 11/04
See application file for complete search history.

(56) References Cited

U.S. PATENT DOCUMENTS 4,527,652 A * 7/1985 Savard, Jr. ................ B62B 3/12 280/DIG. 5
8,327,961 B2 * 12/2012 Arpino .................. B62D 51/04 180/19.1
10,113,636 B2 * 10/2018 Rice ........................ F16D 23/12
2005/0126326 A1 * 6/2005 Onodera ............. F16H 59/0204 74/473.18

FOREIGN PATENT DOCUMENTS

JP 2019073086 A * 5/2019

OTHER PUBLICATIONS

English Translation of JP2019073086A (Year: 2019).*

* cited by examiner

*Primary Examiner* — Victor L Macarthur
(74) *Attorney, Agent, or Firm* — Harness, Dickey & Pierce, P.L.C.

(57) ABSTRACT

An operation device receives an operation which an operator has carried out in order to move an operation target. The operation device includes an operation section, a first member, a second member, and a force sensor. The operation section is capable of being subjected to one or both of a tilting operation and a rotating operation. The first member is mechanically connected to the operation section and is displaced in accordance with an amount of operation by the operation section. The second member stops the first member at a predetermined stop position. The force sensor detects, while the second member is stopping the first member, a force or moment which is applied to the second member.

8 Claims, 8 Drawing Sheets

OPERATION DEVICE AND CARRIAGE

This Nonprovisional application claims priority under 35 U.S.C. § 119 on Patent Application No. 2022-174918 filed in Japan on Oct. 31, 2022, the entire contents of which are hereby incorporated by reference.

TECHNICAL FIELD

The present disclosure relates to an operation device and a carriage.

BACKGROUND ART

A work carriage is known that has a power assist function and that is operated by an operation lever integrated with a force sensor (for example, Patent Literature 1).

CITATION LIST

Patent Literature

Patent Literature 1

Japanese Patent Application Publication Tokukai No. 2019-73086

SUMMARY OF INVENTION

Technical Problem

However, in an operation device in which a force sensor is used, a handle hardly moves during operation due to a structure in which an operating force is detected by a strain element. This unfortunately makes it difficult for an operator to obtain a real feeling of operation.

An aspect of the present disclosure has an object to provide an operation device that makes it possible to provide an operator with a real feeling of operation.

Solution to Problem

In order to attain the object, an operation device in accordance with an aspect of the present disclosure receives an operation which an operator has carried out in order to move an operation target. The operation device includes an operation section, a first member, a second member, and a force sensor. The operation section is capable of being subjected to one or both of a tilting operation and a rotating operation. The first member is mechanically connected to the operation section and is displaced in accordance with an amount of operation by the operation section. The second member stops the first member at a predetermined stop position. The force sensor detects, while the second member is stopping the first member, a force or moment which is applied to the second member.

Advantageous Effects of Invention

An aspect of the present disclosure makes it possible to provide an operator with a real feeling of operation.

DESCRIPTION OF EMBODIMENTS (Configuration of Carriage)

Figure 1:
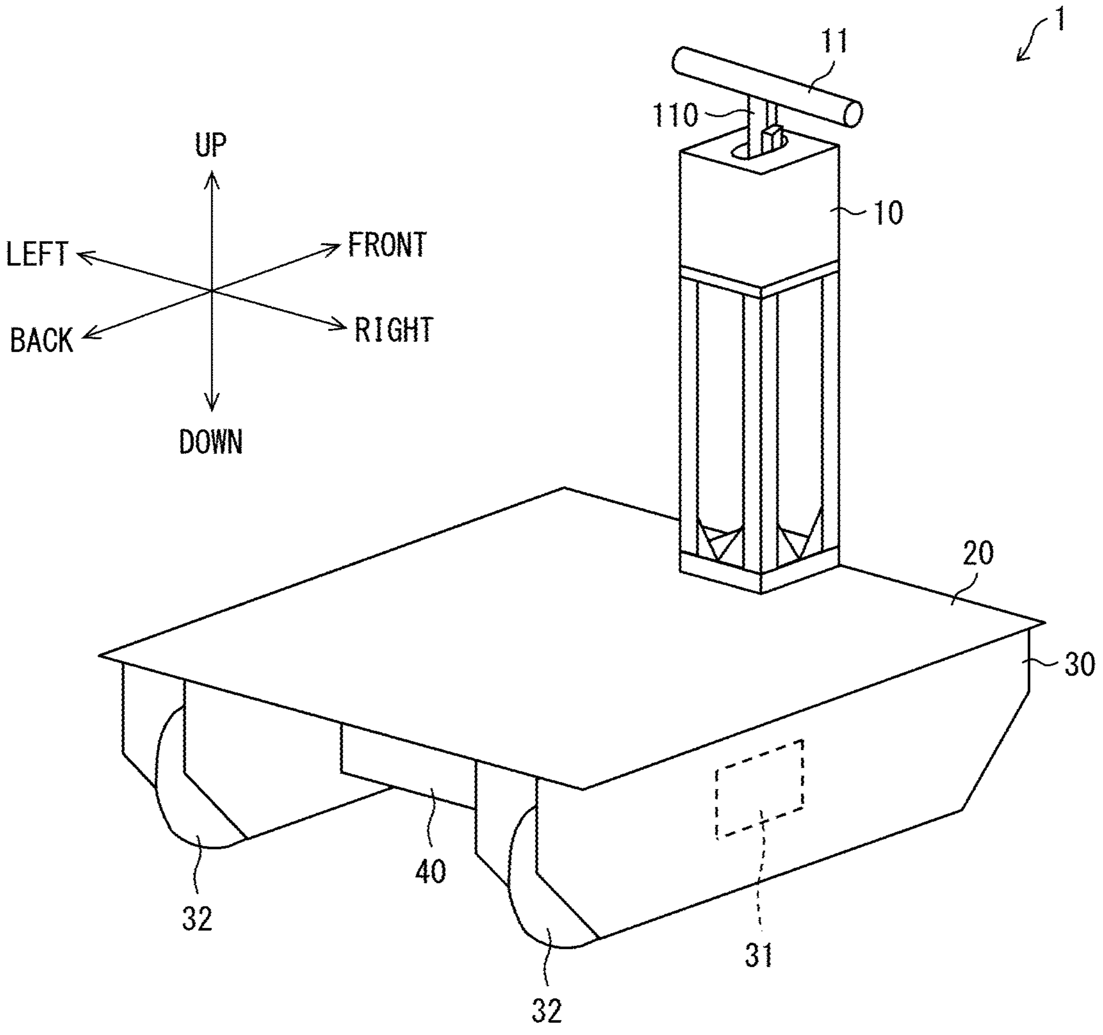
FIG. 1 is a diagram illustrating an example configuration of a carriage in accordance with an embodiment of the present disclosure.

The following description specifically discusses an embodiment of the present disclosure. FIG. 1 is a diagram illustrating an example configuration of a carriage in accordance with an embodiment of the present disclosure. A carriage 1 in accordance with an embodiment of the present disclosure includes an operation device 10, a mounting base 20, a traveling section 30, and a control device 40. The following description defines an up-down direction, a front-back direction, and a right-left direction of the carriage 1 as illustrated by arrows in FIG. 1.

The operation device 10 is an example of an operation device in accordance with an embodiment of the present disclosure. An operator of the operation device 10 and a transport target can be placed on an upper surface of the mounting base 20. The operation device 10 includes an operation section 11 and receives an operation for moving the carriage 1.

The operation section 11 illustrated in FIG. 1 is a T-shaped handle. The operation section 11 is provided at a height that makes it easy for the operator who has mounted on the mounting base 20 to carry out an operation. The operator can carry out (i) a tilting operation for tilting the operation section 11 in the front-back direction and (ii) a rotating operation for rotating the operation section 11 about a steering shaft 110. The operation device 10 will be described later in detail.

The traveling section 30 supports the mounting base 20 from below. The traveling section 30 includes a driving section 31 and drives wheels 32 by a driving force supplied from the driving section 31. The control device 40 controls the traveling section 30 on the basis of the operation received by the operation device 10.

Figure 2:
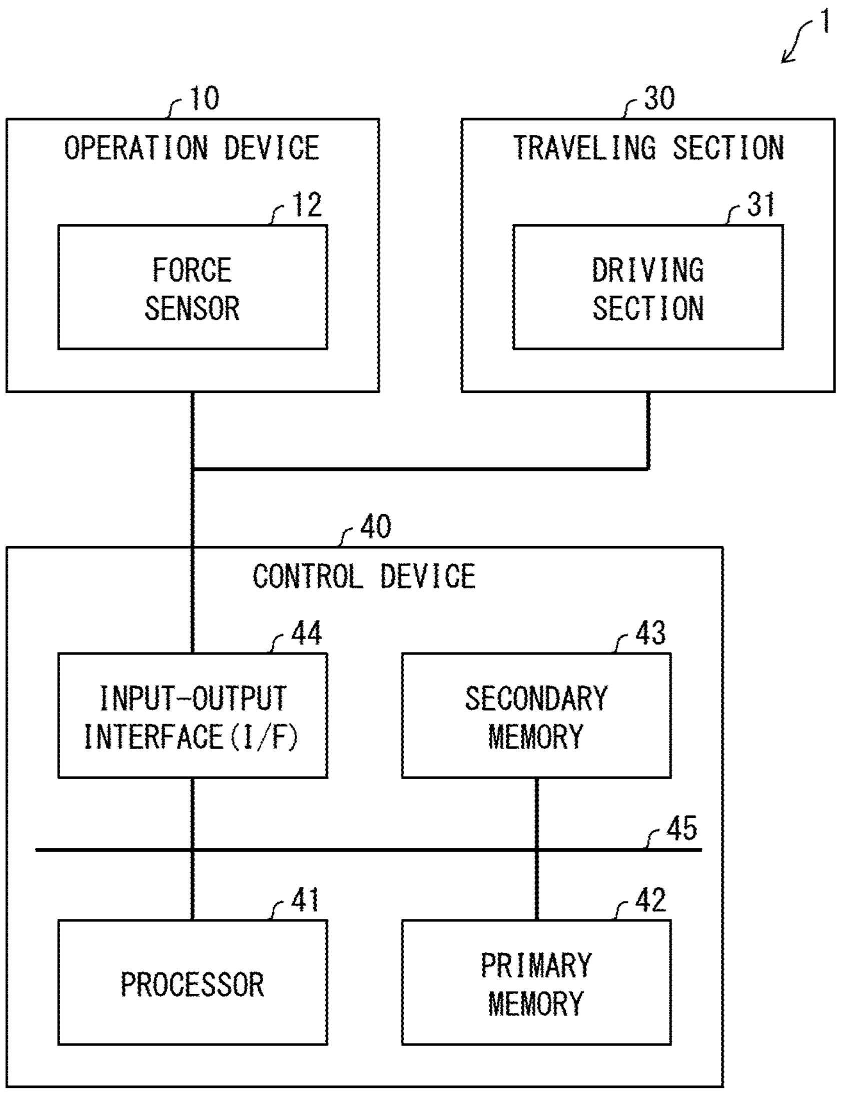
FIG. 2 is a diagram of a system configuration of a carriage in accordance with an embodiment of the present disclosure.

FIG. 2 is a diagram of a system configuration of the carriage 1. The operation device 10 includes a force sensor 12. The force sensor 12 detects a direction and magnitude of a force and a moment each acting on the force sensor 12. The force sensor 12 is a six-axis force sensor that detects (i) magnitude of forces (FX, FY, and FZ) acting in respective directions of three axes (an X-axis, a Y-axis, and a Z-axis)

which are orthogonal to each other and (ii) magnitude of moments (MX, MY, and MZ) about the respective axes.

The control device 40 includes a processor 41, a primary memory 42, a secondary memory 43, and an input-output interface (I/F) 44. The processor 41, the primary memory 42, the secondary memory 43, and the input/output interface (I/F) 44 are connected to each other via a bus 45.

The secondary memory 43 stores a program for causing the processor 41 to carry out a process for controlling an action of the carriage 1. The processor 41 loads, in the primary memory 42, the program stored in the secondary memory 43. In accordance with instructions contained in the program that has been loaded in the primary memory 42, the processor 41 carries out the process for controlling the action of the carriage 1.

Examples of a device that can be used as the processor 41 include a central processing unit (CPU), a graphic processing unit (GPU), a digital signal processor (DSP), a micro processing unit (MPU), a floating point number processing unit (FPU), a physics processing unit (PPU), a microcontroller, and a combination thereof. The processor 41 may be referred to as a "computing device".

Examples of a device that can be used as the primary memory 42 include a semiconductor random access memory (RAM). The primary memory 42 may be referred to as a "main storage".

Examples of a device that can be used as the secondary memory 43 include a flash memory, a hard disk drive (HDD), a solid state drive (SSD), an optical disk drive (ODD), and a combination thereof. The secondary memory 43 may be referred to as an "auxiliary storage".

(Configuration of Operation Device and Operation Capable of Being Received)

Figure 3:
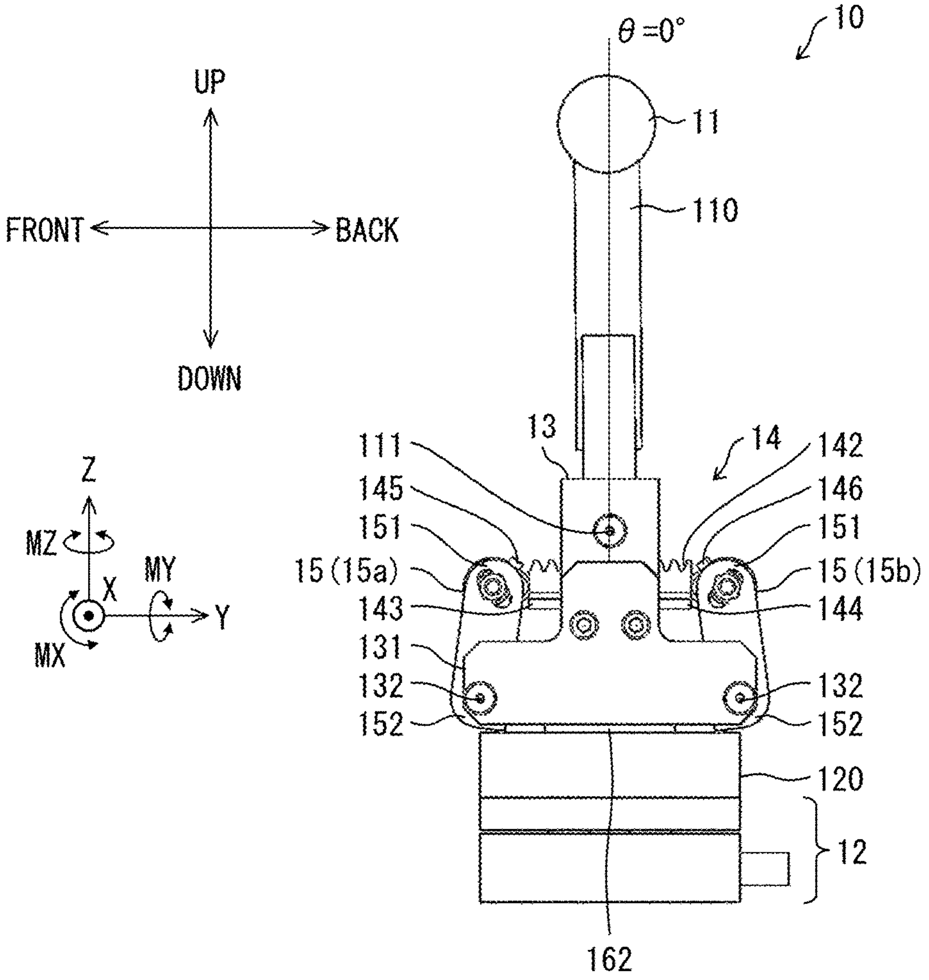
FIG. 3 is a side view illustrating an internal configuration of an operation device in accordance with an embodiment of the present disclosure.

FIG. 3 is a side view illustrating an internal configuration of the operation device 10 in accordance with an embodiment of the present disclosure. The operation device 10 includes the operation section 11, the force sensor 12, a base 13, a rack and pinion 14, and cam parts 15 as illustrated in FIG. 3. Axial directions of a force and a moment that are detected by the force sensor 12 are hereinafter defined as illustrated by arrows in FIG. 3.

The operation section 11 can be tilted about a rotating shaft 111 in the front-back direction. The operation section 11 illustrated in FIG. 3 is located at an initial position in which the steering shaft 110 extends in the up-down direction. In this case, the operation section 11 has a tilted angle θ of 0 degree, which is an initial value.

Figure 4:
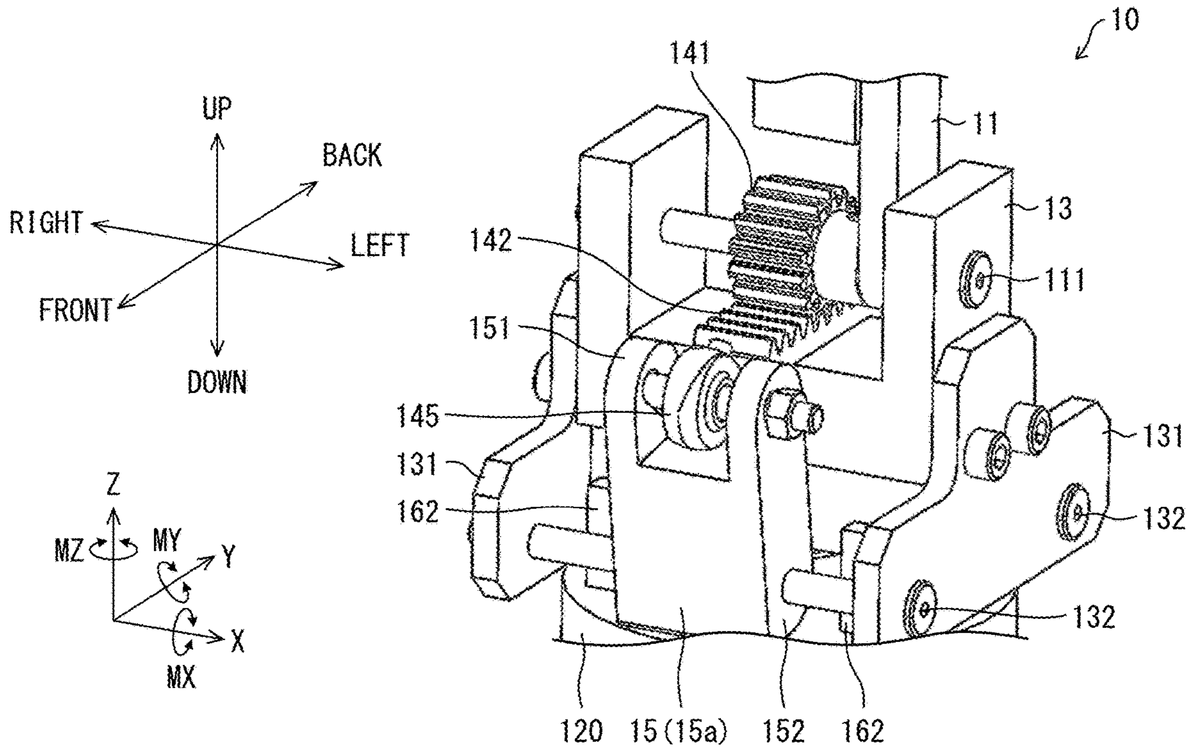
FIG. 4 is an enlarged perspective view of a rack and pinion of FIG. 3 and its surrounding area.

FIG. 4 is an enlarged perspective view of the rack and pinion 14 of FIG. 3 and its surrounding area. The rack and pinion 14 is included in a first member related to the tilting operation. The rack and pinion 14 includes a pinion gear 141 and a rack gear 142. The pinion gear 141 rotates, in accordance with the tilted angle θ of the operation section 11, about the rotating shaft 111 which is provided on the base 13. The rack gear 142 meshes with the pinion gear 141 and can be horizontally moved in the front-back direction. The rack gear 142 moves backward in a case where the operation section 11 is tilted forward, and moves forward in a case where the operation section 11 is tilted backward.

As illustrated in FIG. 3, the rack gear 142 has a front end 143 that is provided with a rod end bearing 145. The rack gear 142 also has a back end 144 that is provided with a rod end bearing 146.

The cam parts 15 are disposed at the front end 143 and the back end 144, respectively, of the rack gear 142. The cam parts 15 are included in the first member related to the tilting operation. Hereinafter, the front end 143 side cam part 15 of the rack gear 142 may be referred to as a cam part **15*a*, and the back end 144 side cam part 15 of the rack gear 142 may be referred to as a cam part 15*b***.

The cam part **15*a* has a first end 151 that is rotatably connected to the front end 143 side rod end bearing 145. Meanwhile, the cam part 15*b* has a first end 151 that is rotatably connected to the back end 144 side rod end bearing 146**.

The cam parts **15*a* and 15*b* have respective second ends 152 at positions facing the first ends 151. The respective second ends 152 of the cam parts 15*a* and 15*b* are connected to brackets 131 of the base 13 so as to be rotatable about respective rotating shafts 132**.

The cam parts **15*a* and 15*b* are tilted in accordance with horizontal movement of the rack gear 142. In a case where the rack gear 142 is horizontally moved forward, the cam parts 15*a* and 15*b* are tilted forward. In a case where the rack gear 142 is horizontally moved backward, the cam parts 15*a* and 15*b*** are tilted backward.

The force sensor 12 is provided below the base 13. A rotating table 120 is provided between the force sensor 12 and the base 13. The rotating table 120 is a second member related to the tilting operation. The rotating table 120 faces the respective second ends 152 of the cam parts **15*a* and 15*b*. In a case where the tilted angle θ of the operation section 11 is the initial value (0 degrees), the respective second ends 152 of the cam parts 15*a* and 15*b* are in no contact with the rotating table 120**.

Figure 5:
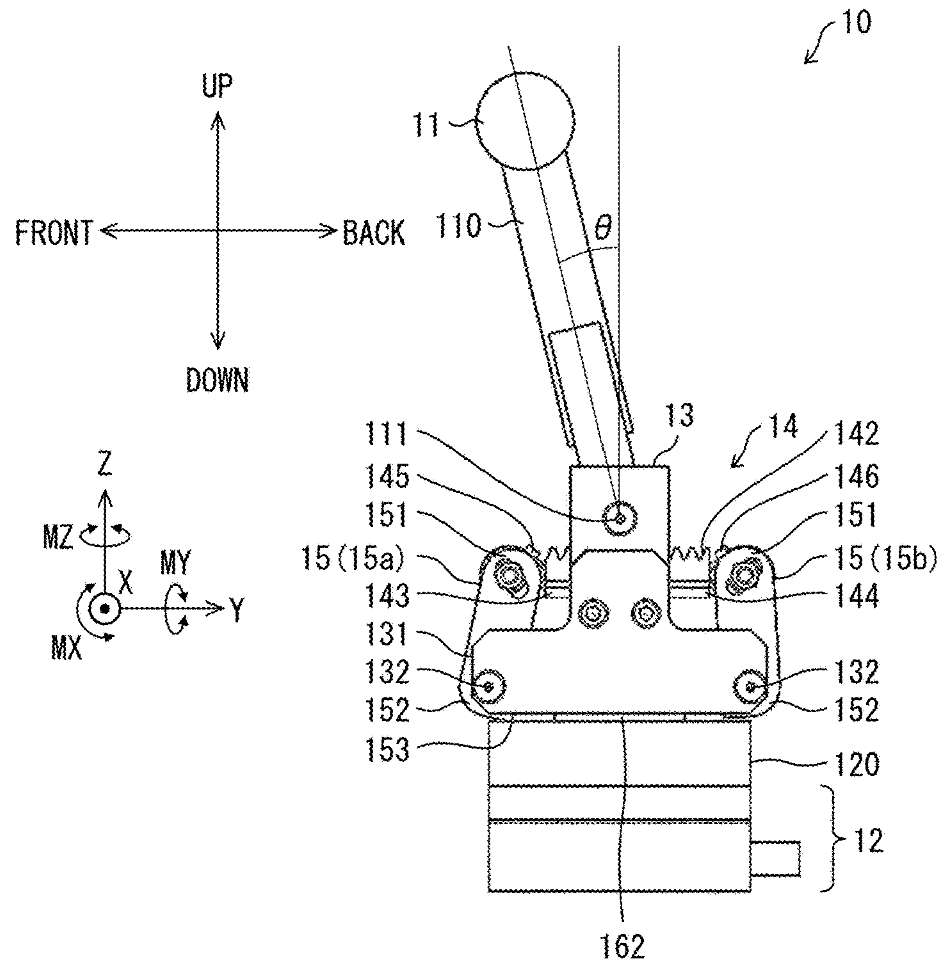
FIG. 5 is a side view illustrating an internal configuration of an operation device in accordance with an embodiment of the present disclosure, and illustrates a state in which an operation section is tilted forward.

FIG. 5 is a side view illustrating an internal configuration of the operation device 10, and illustrates a state in which the operation section 11 is tilted forward by a predetermined angle. Since the operation section 11 is tilted forward, the rack gear 142 is horizontally moved backward, and the cam parts **15*a* and 15*b* are tilted backward than in FIG. 3. In this case, a tip part 153 of the second end 152 of the cam part 15*a* comes into contact with the rotating table 120. The force sensor 12 detects the force FZ and the moment MX that are applied to the rotating table 120 from the tip part 153 of the second end 152 of the cam part 15*a*. In a case where the tip part 153 of the second end 152 of the cam part 15*a* comes into contact with the rotating table 120, the cam part 15*a* stops horizontal backward movement of the rack gear 142. In a case where the operator simultaneously carries out the tilting operation and the rotating operation with respect to the operation section 11, the force sensor 12** may further detect the moment MY in addition to the force FZ and the moment MX.

In contrast, though not illustrated, in a case where the operation section 11 is tilted backward by a predetermined angle, the rack gear 142 is horizontally moved forward, and the cam parts **15*a* and 15*b* are tilted forward than in FIG. 3. In this case, a tip part 153 of the second end 152 of the cam part 15*b* comes into contact with the rotating table 120. The force sensor 12 detects the force FZ and the moment MX that are applied to the rotating table 120 from the tip part 153 of the second end 152 of the cam part 15*b*. In a case where the tip part 153 of the second end 152 of the cam part 15*b* comes into contact with the rotating table 120, the cam part 15*b* stops horizontal forward movement of the rack gear 142**.

In a case where the moment MX that is applied from the tip part 153 of the second end 152 of the cam part **15*a* is detected, the control device 40 illustrated in FIG. 2 controls the traveling section 30 in accordance with magnitude of the moment MX so as to cause the carriage 1 to move forward. In contrast, in a case where the moment MX that is applied from the tip part 153 of the second end 152** of the cam part

15*b* is detected, the control device 40 controls the traveling section 30 in accordance with magnitude of the moment MX so as to cause the carriage 1 to move backward.

In a case where the operation section 11 is returned to the initial position illustrated in FIG. 3, that is, in a case where the tilted angle θ of the operation section 11 is reset to the initial value, the rack gear 142 is returned to its initial position. In this case, the cam parts 15*a* and 15*b* are also returned to their respective initial positions. This results in a state in which the respective second ends 152 of the cam parts 15*a* and 15*b* are in no contact with the rotating table 120. Since magnitude of the moment MX that is detected by the force sensor 12 is reset to an initial value, the control device 40 illustrated in FIG. 2 controls the traveling section 30 so as to stop the carriage 1.

Figure 6:
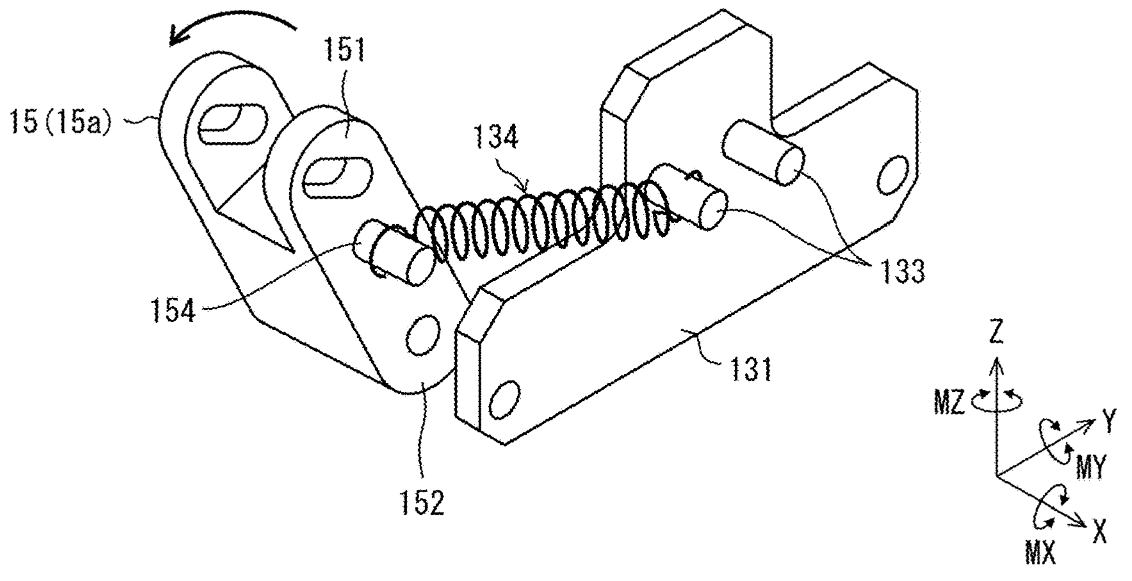
FIG. 6 illustrates an example of an urging member for resetting a tilted angle of an operation section to an initial value.

FIG. 6 illustrates an example of a first urging section for resetting the tilted angle θ of the operation section 11 to the initial value. As illustrated in FIG. 6, bracket 131 of the base 13 has two protruding parts 133 in its upper central part, and the cam part 15 has a protruding part 154 between the first end 151 and the second end 152. A tension spring 134 is provided between the protruding parts 133 of the bracket 131 and the protruding part 154 of the cam part 15, and the cam part 15 is urged toward the protruding parts 133 of the bracket 131. The protruding parts 133 may be fastening parts for fixing the bracket 131 to the base 13, and one ends of the protruding parts 133 may be co-fastened in the fastening parts. Note that FIG. 6 illustrates no cam part 15*b* and no tension spring 134 that is provided in the protruding part 154 of the cam part 15*b*.

For example, in a case where the operator tilts the operation section 11 forward to the position illustrated in FIG. 5, the rack gear 152 is horizontally moved backward, and the cam part 15*b* is tilted backward. This results in extension of the tension spring 134 (not illustrated) between the cam part 15*b* and the bracket 131. The tension spring 134 urges the cam part 15*b* toward the protruding parts 133 of the bracket 131 by an urging force in accordance with an amount of extension of the tension spring 134. In a case where the operator releases its hold of the operation section 11, the cam part 15*b* is tilted forward by an urging force of the tension spring 134, and pushes back the rack gear 142 forward. Horizontal movement of the rack gear 142 is transmitted to the operation section 11 by the pinion gear 141, and the operation section 11 is tilted backward, so that the tilted angle θ is reset to 0 degree, and the operation section 11 is returned to the initial position illustrated in FIG. 3.

Similarly, in a case where the operator tilts the operation section 11 backward, the rack gear 152 is horizontally moved forward, and the cam part 15*a* is tilted forward. This results in extension of the tension spring 134 (not illustrated) between the cam part 15*a* and the bracket 131. The tension spring 134 urges the cam part 15*a* toward the protruding parts 133 of the bracket 131 by an urging force in accordance with an amount of extension of the tension spring 134. In a case where the operator releases its hold of the operation section 11, the cam part 15*a* is tilted backward by an urging force of the tension spring 134, and pushes back the rack gear 142 backward. Horizontal movement of the rack gear 142 is transmitted to the operation section 11 by the pinion gear 141, and the operation section 11 is tilted forward, so that the tilted angle θ is reset to 0 degree, and the operation section 11 is returned to the initial position illustrated in FIG. 3.

The tilted angle θ of the operation section 11 when the cam part 15*a* or the cam part 15*b* stops horizontal movement of the rack gear 142 has a value of approximately 10 degrees. More specifically, the tilted angle θ of the operation section 11 when the cam part 15*a* or the cam part 15*b* stops horizontal movement of the rack gear 142 has a value not less than 5 degrees and not more than 15 degrees, and more preferably a value not less than 8 degrees and not more than 12 degrees. In a case where the moment MX that is detected by the force sensor 12 is optimized so as to linearly increase in accordance with an increase in absolute value of the tilted angle θ of the operation section 11, a shape of the second end 152 of the cam part 15 does not make the operator feel discomfort.

The operation section 11, the rack and pinion 14, and the cam part 15 are preferably rigid to a degree of not being elastically deformed by at least an operation by a worker. Since the operation section 11, the rack and pinion 14, and the cam part 15 are not elastically deformed by human power, a linear correlation is obtained between (a) a force applied in order to tilt the operation section 11 and (b) the force and the moment that are detected by the force sensor 12.

The operation section 11 can receive the rotating operation in addition to the tilting operation described above. FIGS. 7 to 10 will be used to describe the rotating operation of the operation section 11.

Figure 7:
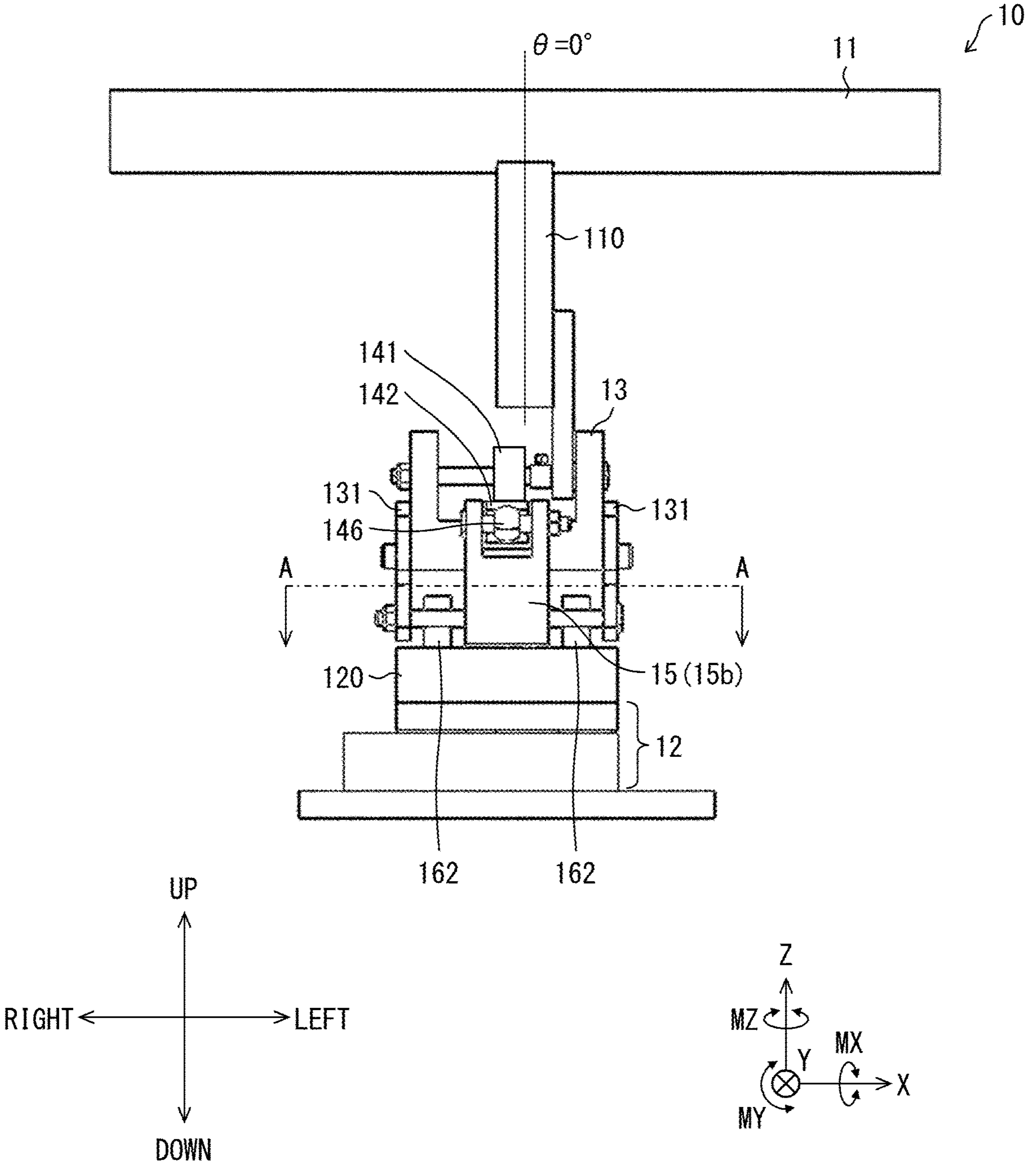
FIG. 7 is a back view illustrating an internal configuration of an operation device in accordance with an embodiment of the present disclosure.
Figure 8:
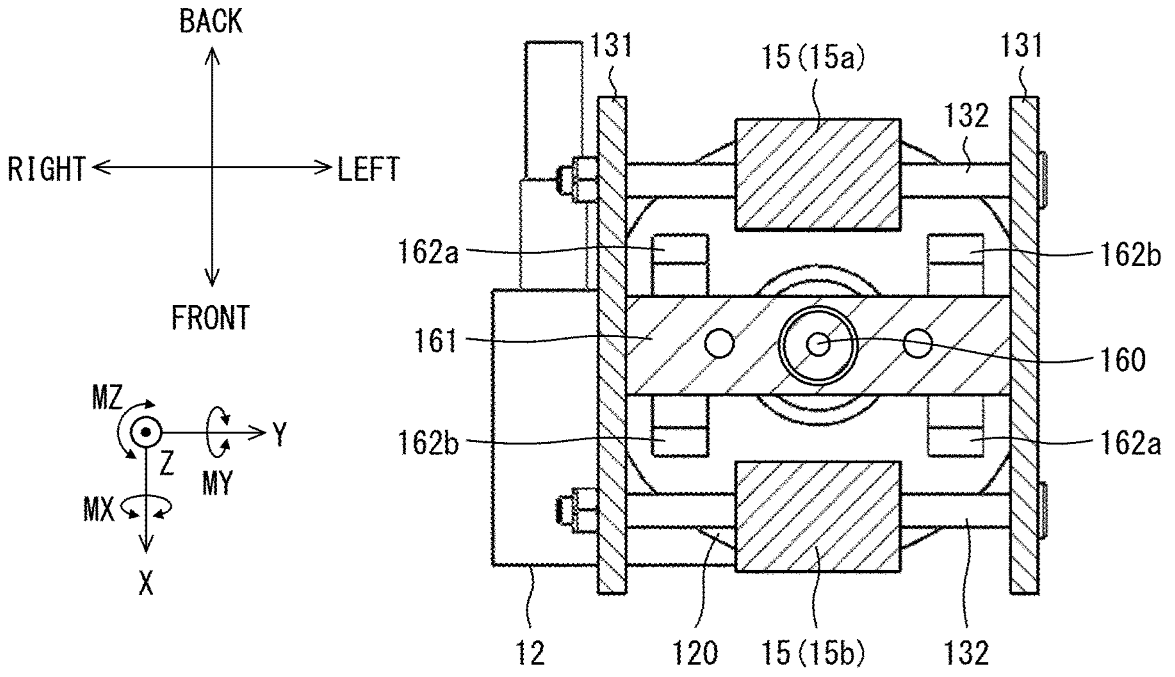
FIG. 8 is an A-A cross-sectional view of FIG. 7.

FIG. 7 is a back view illustrating the internal configuration of the operation device 10. FIG. 8 is an A-A cross-sectional view of FIG. 7. As illustrated in FIG. 8, the rotating table 120 has a cylindrical shape. The rotating table 120 has, at or near its center, a rotating shaft 160 for the rotating operation. A rotating part 161 provided on the rotating table 120 is rotatably connected to the rotating shaft 160. The rotating part 161 has an end connected to the bracket 131.

The rotating part 161 is the first member related to the rotating operation. In a case where the operator rotates the operation section 11 about the steering shaft 110, the base 13, the rack and pinion 14, and the cam part 15 rotate about the rotating shaft 160 in a direction identical to the direction in which the operation section 11 is rotated. The rotating part 161 has an initial position illustrated in FIG. 8. When the rotating part 161 is located at the initial position, the operation section 11 has a rotation angle φ of 0 degree, which is an initial value.

The rotating table 120 has stopping parts 162 that project from a surface on which the rotating part 161 is provided. The stopping parts 162 are each the second member related to the rotating operation. The stopping parts 162 are fixed to the rotating table 120. The stopping parts 162 each have a first projecting part 162*a* and a second projecting part 162*b*. In a case where the operator rotates the operation section 11 clockwise by the rotation angle φ from the initial position, the rotating part 161 rotates clockwise by the rotation angle φ. In a case where the operator rotates the operation section 11 counterclockwise by the rotation angle φ from the initial position, the rotating part 161 rotates counterclockwise by the rotation angle φ.

Figure 9:
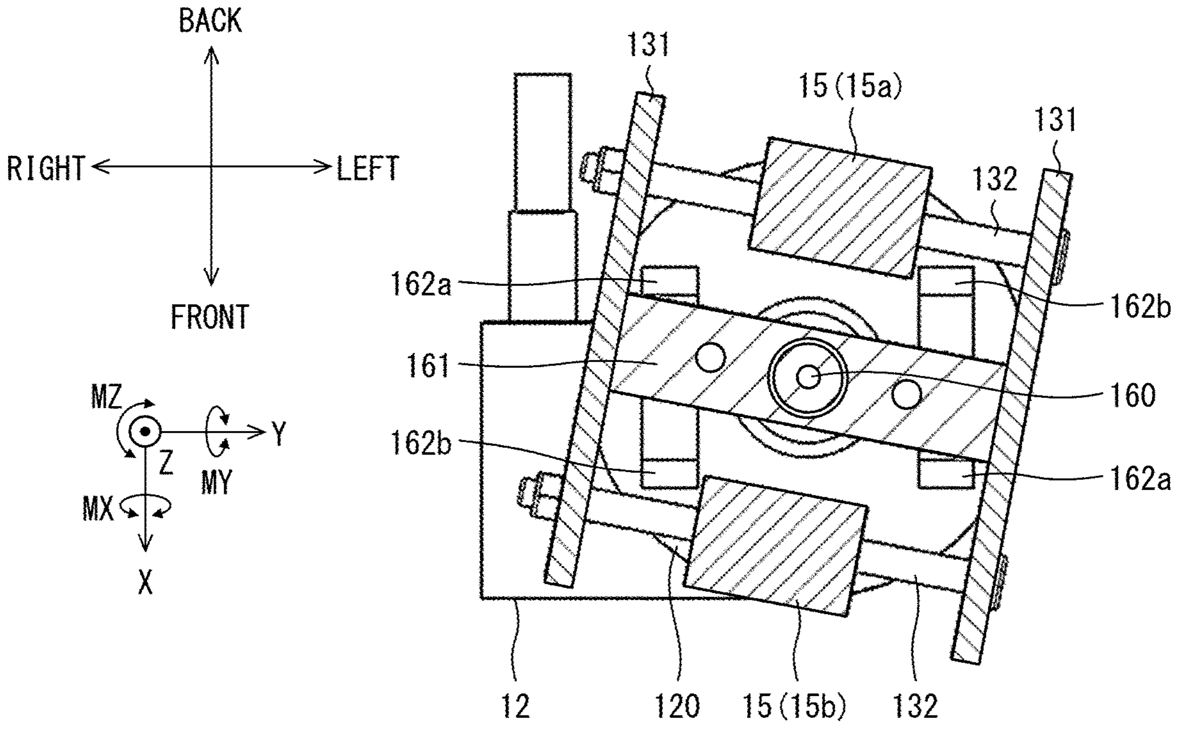
FIG. 9 illustrates a state obtained by rotating a rotating part clockwise from the cross-sectional view of FIG. 8.

In a case where the operation section 11 rotates by a predetermined angle clockwise from the initial position, the rotating part 161 comes into contact with the first projecting part 162*a* as illustrated in FIG. 9 so as to stop rotation of the rotating part 161. In a case where the operation section 11 rotates by a predetermined angle counterclockwise from the initial position, the rotating part 161 comes into contact with the second projecting part 162*b* so as to stop rotation of the rotating part 161.

When the rotating part 161 comes into contact with the first projecting part 162*a* or the second projecting part 162*b*, the force sensor 12 detects the moment MZ that is applied from the rotating part 161 via the stopping parts 162 of the rotating table 120.

The control device 40 illustrated in FIG. 2 determines a rotation direction of the operation section 11 on the basis of the moment MZ detected by the force sensor 12, and controls the traveling section 30 in accordance with magnitude of the moment MZ so as to change a traveling direction of the carriage 1. In a case where a moment that is applied from the rotating part 161 to the first projecting part 162*a* is detected by the force sensor 12, the control device 40 controls the traveling section 30 so as to change the traveling direction of the carriage 1 to the right. In a case where a moment that is applied from the rotating part 161 to the second projecting part 162*b* is detected by the force sensor 12, the control device 40 controls the traveling section 30 so as to change the traveling direction of the carriage 1 to the left.

Figure 10:
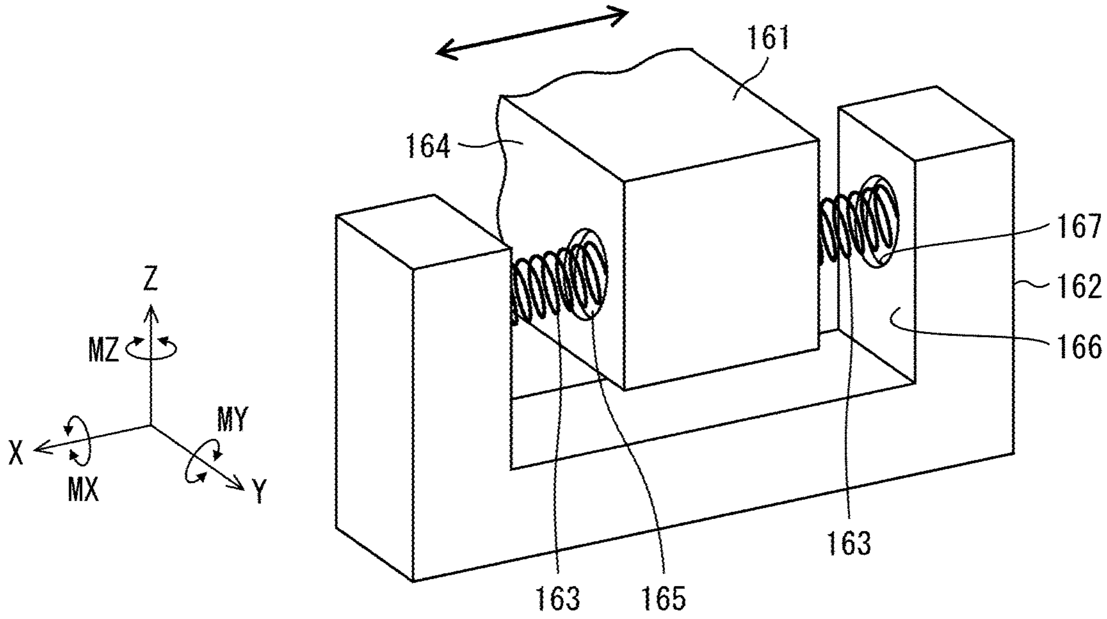
FIG. 10 illustrates an example of an urging member for resetting a rotation angle of an operation section to an initial value.

FIG. 10 illustrates an example of a second urging section for resetting the rotation angle φ of the operation section 11 to the initial value. As illustrated in FIG. 10, the rotating part 161 has recessed parts 165 on respective both side surfaces 164, and compression springs 163 have respective one ends that are fixed to bottom parts of the recessed parts 165. Further, the stopping parts 162 have respective recessed parts 167 on surfaces 166 that face the both side surfaces 164 of the rotating part 161, and the compression springs 163 have respective other ends that are fixed to bottom parts of the recessed parts 167. In a case where the rotating part 161 rotates by the rotating operation of the operation section 11 and comes into contact with the stopping parts 162, the compressed compression springs 163 are accommodated in gaps between the recessed parts 165 and the recessed parts 167.

The compression springs 163 urge the rotating part 161 in a direction in which the rotation angle φ of the operation section 11 is reset to the initial value. For example, in a case where the rotating operation for rotating the operation section 11 clockwise from the initial position is being carried out, the compression springs 163 urge the rotating part 161 in a direction in which the operation section 11 is rotated counterclockwise. In contrast, in a case where the rotating operation for rotating the operation section 11 counterclockwise from the initial position is being carried out, the compression springs 163 urge the rotating part 161 in a direction in which the operation section 11 is rotated clockwise. In a case where the operator releases its hold of the operation section 11, the rotating part 161 rotates by an urging force of the compression springs 163 and returns to the initial position illustrated in FIG. 8.

The rotation angle φ of the operation section 11 when the first projecting part 162*a* or the second projecting part 162*b* stops rotation of the rotating part 161 is approximately 20 degrees. More specifically, the rotation angle φ of the operation section 11 when the first projecting part 162*a* or the second projecting part 162*b* stops rotation of the rotating part 161 has a value not less than 15 degrees and not more than 25 degrees, and more preferably a value not less than 18 degrees and not more than 22 degrees.

Variation

The above embodiment has shown an example in which the operation device 10 is applied to the carriage 1. Note, however, that an operation target of the operation device 10 is not limited only to a carriage. For example, the operation device 10 is applicable also to a game device that simulates control of a mobile object such as an automobile, and an operation device for operating, for example, a drone.

The operation device 10 in accordance with the above embodiment is configured such that the operation section 11 is a T-shaped handle. Note, however, that the operation section 11 is not limited only to the T-shaped handle. For example, the operation section 11 may be an L-shaped handle.

The operation device 10 in accordance with the above embodiment is configured to be capable of receiving (i) the tilting operation for tilting the operation section 11 in the front-back direction and (ii) the rotating operation for rotating the operation section 11 about the steering shaft 110. Note, however, that the operation device 10 is not limited only to this. For example, the operation device may be configured to be capable of receiving only one of the tilting operation and the rotating operation. Alternatively, the operation device may be configured to further receive an operation different from the tilting operation and the rotating operation.

The operation device 10 in accordance with the above embodiment is configured such that the operation section 11 is tilted about the rotating shaft 111 in the front-back direction, and the pinion gear 141 is rotated about the identical rotating shaft 111. Note, however, that the rotating shaft about which the operation section 11 is tilted and the rotating shaft about which the pinion gear 141 is rotated need not be identical. For example, one or more speed change gears may be interposed between the rotating shaft 111 about which the operation section 11 is tilted and the rotating shaft about which the pinion gear 141 is rotated.

The operation device 10 in accordance with the above embodiment is configured such that the rotating part 161 rotates clockwise by the rotation angle φ in a case where the operation section 11 rotates about the steering shaft 110 by the rotation angle φ. Note, however, that the angle by which the operation section 11 rotates and the angle by which the rotating part 161 rotates need not be identical. For example, rotation of the operation section 11 may be transmitted to the rotating part 161 via, for example, one or more speed change gears.

The operation device 10 in accordance with the above embodiment is configured such that the tension spring 134 is provided between the protruding parts 133 of the bracket 131 and the protruding part 154 of the cam part 15, and the cam part 15 is urged toward the protruding parts 133 of the bracket 131. Note, however, that the urging section which is provided between the protruding parts 133 of the bracket 131 and the protruding part 154 of the cam part 15 is not limited only to the tension spring 134. For example, the urging section that is provided between the protruding parts 133 of the bracket 131 and the protruding part 154 of the cam part 15 may be made of, for example, an elastic polymer material such as rubber.

The operation device 10 in accordance with the above embodiment is configured such that the compression springs 163 are provided between the recessed parts 165 of the rotating part 161 and the recessed parts 167 of the stopping parts 162. Note, however, that the urging section that is provided between the recessed parts 165 of the rotating part 161 and the recessed parts 167 of the stopping parts 162 is not limited only to the compression springs 163. For example, the urging section that is provided between the recessed parts 165 of the rotating part 161 and the recessed parts 167 of the stopping parts 162 may be made of, for example, an elastic polymer material such as rubber.

The carriage 1 in accordance with the above embodiment is configured such that the wheels 32 are driven by the driving force supplied from the driving section 31. Note, however, a target to be driven by the driving force supplied from the driving section 31 is not limited to the wheels 32. For example, an infinite track may alternatively be driven by the driving force supplied from the driving section 31.

Additional Remark

The present disclosure is not limited to the above embodiments, but can be altered in various ways within the scope of the claims. The present disclosure also encompasses, in its technical scope, any embodiment derived by appropriately combining technical means disclosed in differing embodiments.

(Item 1) An operation device that receives an operation which an operator has carried out in order to move an operation target, the operation device including: an operation section that is capable of being subjected to one or both of a tilting operation and a rotating operation; a first member that is mechanically connected to the operation section and that is displaced in accordance with an amount of operation by the operation section; a second member that stops the first member at a predetermined stop position; and a force sensor that detects, while the second member is stopping the first member, a force or moment which is applied to the second member.

According to the above configuration, the operation section is mechanically connected to the first member. It is therefore possible to make the operator feel an operation reaction force corresponding to content of operation, and provide the operator with a real feeling of operation.

(Item 2) The operation device according to Item 1, wherein the first member includes a pinion gear, a rack gear that meshes with the pinion gear, and a cam part that has a first end which is rotatably connected to the rack gear, the rack gear is displaced by rotation of the pinion gear in accordance with a tilted angle of the operation section, and the cam part is tilted in accordance with displacement of the rack gear, when the tilted angle of the operation section reaches a predetermined angle, a second end of the cam part, the second end being different from the first end, comes into contact with the second member so as to stop displacement of the rack gear, and the force sensor detects, while displacement of the rack gear is being stopped, the moment which is applied to the second member from the second end of the cam part.

According to the above configuration, the operation section is mechanically connected to the pinion gear, the rack gear, and the cam part. It is therefore possible to make the operator feel an operation reaction force corresponding to content of operation, and provide the operator with a real feeling of operation.

(Item 3) The operation device according to Item 2, further including a first urging section that urges the cam part in a direction in which the rack gear is pushed back to a position corresponding to a predetermined initial value of the tilted angle.

According to the above configuration, the operation section can be returned to an initial position of the tilting operation when the operator stops the tilting operation. Furthermore, it is possible to provide the operator with a real feeling of operation by making the operator feel an urging force in accordance with an operation angle.

(Item 4) The operation device according to Item 2 or 3, wherein the predetermined angle is not less than 5 degrees and not more than 15 degrees.

According to the above configuration, the force sensor detects the moment of the force in a case where the operation section is tilted to an angle which allows the operator to really feel that the operation section is tilted. It is therefore possible to provide the operator with a real feeling of operation.

(Item 5) The operation device according to any one of Items 1 to 4, wherein the first member includes a rotating part that is provided on the second member and that rotates in accordance with a rotation angle of the operation section, the second member has a stopping part that projects from a surface of the second member on which surface the rotating part is provided, when the rotation angle of the operation section reaches a predetermined angle, the rotating part comes into contact with the stopping part so as to stop rotation of the rotating part, and the force sensor detects, while the stopping part is stopping rotation of the rotating part, the moment which is applied to the stopping part.

According to the above configuration, the operation section is mechanically connected to the rotating part and the stopping part. It is therefore possible to make the operator feel an operation reaction force corresponding to content of operation, and provide the operator with a real feeling of operation.

(Item 6) The operation device according to Item 5, further including a second urging section that is provided between the rotating part and the stopping part, and that urges the rotating part in a direction in which the rotation angle of the operation section is reset to an initial value, the rotating part and the stopping part each having a recessed part that accommodates the second urging section while the rotating part is in contact with the stopping part.

According to the above configuration, the operation section can be returned to an initial position of the rotating operation when the operator stops the rotating operation. Furthermore, it is possible to provide the operator with a real feeling of operation by making the operator feel an urging force in accordance with a rotation angle.

(Item 7) The operation device according to Item 5 or 6, wherein the predetermined angle is not less than 15 degrees and not more than 25 degrees.

According to the above configuration, the force sensor detects the moment of the force in a case where the operation section is rotated to an angle which allows the operator to really feel that the operation section is rotated. It is therefore possible to provide the operator with a real feeling of operation.

(Item 8) The operation device according to any one of Items 1 to 7, wherein the operation section is an L-shaped or T-shaped handle.

According to the above configuration, the operator can use the operation section to easily carry out both the tilting operation and the rotating operation.

(Item 9) A carriage including: an operation device according to any one of Items 1 to 8; a mounting base; a traveling section that includes a driving section and that travels by a driving force supplied from the driving section; and a control device that includes at least one processor, the at least one processor carrying out a process for controlling the traveling section in accordance with the force or moment which has been detected by the force sensor.

In a carriage including an operation device in which a force sensor is used, an operation section hardly moves during operation due to a structure in which a force is detected by, for example, an amount of strain of a strain element. This prevents an operator from obtaining a real feeling of operation and makes it difficult for the operator to be familiar with operation. According to the above configuration, it is possible to make the operator feel an operation reaction force corresponding to content of operation, and provide the operator with a real feeling of operation.

The invention claimed is:

1. An operation device for receiving an operation carried out by an operator in order to move an operation target, said operation device comprising:

an operation section that is capable of being subjected to one or both of a tilting operation and a rotating operation;

a first member that is mechanically connected to the operation section and is displaceable in accordance with an amount of one or both of the tilting operation and the rotating operation by the operation section, the first member including a pinion gear, a rack gear adapted to mesh with the pinion gear, and a cam part that has a first end which is rotatably connected to the rack gear;

a second member adapted to stop the first member at a predetermined stop position; and a force sensor adapted to detect, while the second member is stopping the first member, a force or moment which is applied to the second member from a second end of the cam part, the second end being different from the first end, wherein the first member includes a pinion gear, a rack gear adapted to mesh with the pinion gear, and a cam part that has a first end which is rotatably connected to the rack gear, the rack gear is displaceable by rotation of the pinion gear in accordance with a tilted angle of the operation section, and the cam part is tiltable in accordance with displacement of the rack gear, when the tilted angle of the operation section reaches a predetermined angle, the second end of the cam part, is adapted to come into contact with the second member so as to stop displacement of the rack gear, and the force sensor is adapted to detect, while the second end of the cam part comes into contact with the second member, the moment applied to the second member.

2. The operation device according to claim 1, further comprising a first urging section adapted to urge the cam part in a direction in which the rack gear is pushed back to a position corresponding to a predetermined initial value of the tilted angle.

3. The operation device according to claim 1, wherein the predetermined angle is not less than 5 degrees and not more than 15 degrees.

4. The operation device according to claim 1, wherein the first member includes a rotating part that is provided on the second member and that rotates in accordance with a rotation angle of the operation section, the second member has a stopping part that projects from a surface of the second member on which surface the rotating part is provided, when the rotation angle of the operation section reaches a predetermined angle, the rotating part is adapted to come into contact with the stopping part so as to stop rotation of the rotating part, and the force sensor adapted to detect, while the stopping part is stopping rotation of the rotating part, the moment which is applied to the stopping part.

5. The operation device according to claim 4, further comprising a second urging section, that is provided between the rotating part and the stopping part, and is adapted to urge the rotating part in a direction in which the rotation angle of the operation section is reset to an initial value, the rotating part and the stopping part each having a recessed part that accommodates the second urging section while the rotating part is in contact with the stopping part.

6. The operation device according to claim 4, wherein the predetermined angle is not less than 15 degrees and not more than 25 degrees.

7. The operation device according to claim 1, wherein the operation section is an L-shaped or T-shaped handle.

8. A carriage comprising:

an operation device recited in claim 1;

a mounting base;

a traveling section that includes a driving section and that travels by a driving force supplied from the driving section; and a control device that includes at least one processor.

* * * * *